DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1045

T887,017
RADIOGRAPHY METHOD

George W. Luckey, Bernard Roth, and Paul W. Wagner, all of Kodak Park Works, Rochester, N.Y. 14650

Filed Mar. 16, 1970, Ser. No. 20,119
Int. Cl. G03b *17/26, 41/16*
U.S. Cl. 250—68
No Drawing. 10 Pages Specification

In radiography the speed of a lead sulfate screen-film system and of a lead-activated barium sulfate screen-film system with a high concentration of lead in the phosphor is increased by reducing the temperature at which the system is exposed to high energy radiation. Acceptable radiographs can be made with low exposures to radiation at temperatures below −50° C. by cooling the screen-film combination with Dry Ice or other means. The speed of a screen which comprises lead sulfate phosphor in a polycarbonate binder is eight times greater at −70° C. than at room temperature.